(12) United States Patent
Payne

(10) Patent No.: US 11,044,922 B2
(45) Date of Patent: Jun. 29, 2021

(54) MILK COAGULATION PROCESS CONTROL TECHNOLOGY

(71) Applicant: Reflectronics, Inc., Lexington, KY (US)

(72) Inventor: Fred Payne, Lexington, KY (US)

(73) Assignee: REFLECTRONICS, INC., Lexington, KY (US)

(*) Notice: Subject to any disclaimer, the term of this patent is extended or adjusted under 35 U.S.C. 154(b) by 0 days.

(21) Appl. No.: 16/824,450

(22) Filed: Mar. 19, 2020

(65) Prior Publication Data

US 2020/0315199 A1 Oct. 8, 2020

Related U.S. Application Data

(60) Provisional application No. 62/830,800, filed on Apr. 8, 2019.

(51) Int. Cl.
*A23C 19/024* (2006.01)

(52) U.S. Cl.
CPC ................ *A23C 19/024* (2013.01)

(58) Field of Classification Search
CPC .................................... A23C 19/024
USPC ......................................... 426/36
See application file for complete search history.

(56) References Cited

U.S. PATENT DOCUMENTS

| | | | |
|---|---|---|---|
| 5,172,193 A * | 12/1992 | Payne | G01N 21/4738 250/574 |
| 5,418,614 A | 5/1995 | Brost et al. | |
| 6,836,325 B2 | 12/2004 | Maczura et al. | |
| 7,310,139 B2 | 12/2007 | Takai et al. | |
| 7,339,657 B2 | 3/2008 | Coates | |
| 7,880,881 B2 | 2/2011 | Everard et al. | |
| 7,892,584 B2 | 2/2011 | Castillo et al. | |
| 8,072,596 B2 | 12/2011 | Katz et al. | |
| 9,983,184 B2 | 5/2018 | Payne | |
| 2003/0098969 A1 | 5/2003 | Katz et al. | |
| 2004/0225222 A1 | 11/2004 | Zeng et al. | |
| 2006/0012793 A1 | 1/2006 | Harris | |
| 2009/0305423 A1 | 12/2009 | Subramanian et al. | |
| 2016/0370286 A1 | 12/2016 | Castillo Zambudio et al. | |
| 2018/0340887 A1 | 11/2018 | Castillo Zambudio et al. | |

FOREIGN PATENT DOCUMENTS

WO 2009080049 A1 7/2009

OTHER PUBLICATIONS

Fagan et al., Preliminary evaluation of endogenous milk fluorophores as tracer molecules for curd syneresis, American Dairy Science Association (Year: 2011).*

Mazerolles et al; "Infrared and Fluorescence Spectroscopy for Monitoring Protein Structure and Interaction Changes During Cheese Ripening"; Le Lait, INRA Editions; 2001 81 (4); pp. 509-527; 10.1051/lait:2001148. HAL-00895355.

Payne et al; "Predicting Optimal Cutting Time of Coagulating Milk Using Diffuse Reflectance1"; Journal of Dairy Science (1993); vol. 76; pp. 48-61.

Panikuttira et al; "Investigation of an In-line Prototype Fluorescence and Infrared Backscatter Sensor to Monitor Rennet-induced Coagulation of Skim Milk at Different Protein Concentrations"; International Journal of Food Science & Technology (2020); vol. 55; pp. 175-182.

Panikuttira et al; "Evaluation of a Fluorescence and Infrared Backscatter Sensor to Monitor Acid Induced Coagulation of Skim Milk"; Innovative Food Science & Emerging Technologies (2019); vol. 54; pp. 219-224.

Panikuttira et al; "Process Analytical Technology for Cheese Manufacture"; International Journal of Food Science & Technology (2018); pp. 1-13.

Payne, "Automatic Control of Coagulum Cutting in Cheese Manufacturing"; American Socieny of Agricultural Engineers; 1995; vol. 22(5); pp. 691-697.

\* cited by examiner

*Primary Examiner* — Brent T O'Hern
(74) *Attorney, Agent, or Firm* — King & Schickli, PLLC

(57) ABSTRACT

Methods are provided for the production of cheese including methods of manufacturing cheese on a desired schedule in a cheese production facility having multiple cheese vats. The methods rely upon various milk processing conditions and milk composition properties.

7 Claims, No Drawings

MILK COAGULATION PROCESS CONTROL TECHNOLOGY

RELATED APPLICATION

This application claims priority to U.S. Provisional Patent Application Ser. No. 62/830,800 filed on Apr. 8, 2019 which is hereby incorporated by reference in its entirety.

TECHNICAL FIELD

This document relates generally to the field of cheese processing and, more particularly to a new and improved method of making a higher quality of cheese on a consistent schedule at any given dairy plant.

BACKGROUND

Modern dairy plants, typically having 4 to 26 cheese vats, need to keep the batch-wise flow of product at a constant rate for efficient downstream processing and packaging. Thus, modern cheese plants have two processing needs for the control of the milk coagulation process: one is to cut the coagulum at the plant's desired endpoint and the second is to keep the flow of batches on a consistent schedule. This document relates to a new and improved automation technology or method, Enzyme Assistant, that has been developed to accomplish these two processing needs simultaneously.

The new method is feasible because of two new developments. The first is the development of improvements in sensor technology (U.S. Pat. No. 9,983,184). The combination of the infrared and fluorescent time-parameters in combination with product and processing parameters has drastically improved the prediction precision of the desired cutting time or endpoint. The second is the development of a mathematical model that accounts for confounding between the Factor Effects. It is the unique and unobvious combination of these two technologies that make feasible a more precise control of the milk coagulation to deliver the desired gel strength at the desired cutting time.

SUMMARY

In accordance with the purposes and benefits described herein, a new and improved method of manufacturing cheese is provided. That method comprises the steps of: (a) monitoring, by at least one optical sensor, infrared backscatter response from a first batch of milk undergoing enzymatic coagulation to form a first batch of milk coagulum, (b) monitoring, by the at least one optical sensor, fluorescence backscatter response from the first batch of milk undergoing enzymatic coagulation to form the first batch of milk coagulum, (c) determining, a first batch cutting time for the first batch of milk coagulum using a controller having control logic configured to base said first batch cutting time upon time parameters generated from a combination of the infrared backscatter response and the fluorescence backscatter response with processing conditions and milk composition properties and (d) determining an amount of enzyme to be added to a second batch of milk to undergo enzymatic coagulation using the controller having the control logic further configured to control a second batch cutting time to a plant cutting time setpoint to maximize product quality and processing efficiency.

In one or more of the many possible embodiments of the method, the method further includes determining, by the controller, a consistence of cutting time predictions to alert an operator to non-consistent backscatter.

In one or more of the many possible embodiments of the method, the method further includes monitoring processing conditions of the first batch of milk wherein the processing conditions are selected from a group of processing conditions consisting of mass of milk in the batch, mass of enzyme addition, enzyme type, enzyme activity, milk temperature, calcium addition and combinations thereof.

In one or more of the many possible embodiments of the method, the method includes monitoring milk composition properties of the first batch of milk and the second batch of milk wherein the milk composition properties are selected from a group of milk properties consisting of protein content, pH, protein to fat ratio, fat and solids content and combinations thereof.

In one or more of the many possible embodiments of the method, the method includes incorporating into the control logic an algorithm that uses infrared and fluorescent time parameters to determine a predicted cutting time of the coagulum and a calibration parameter for adjustment in the plant and the predicted cutting time is independent of the enzyme addition time.

In accordance with an additional aspect, the new and improved method of manufacturing cheese includes the steps of: (a) measuring coagulation reaction, processing and product information from a first batch of milk undergoing enzymatic coagulation to form a first batch of milk coagulum, (b) measuring processing and product information from a second batch of milk about to undergo enzymatic coagulation and (c) estimating, by controller, a mass of enzyme to be added to the second batch of milk to achieve a desired gel strength at a desired cutting time based upon the measured coagulation reaction, processing and product information from the first batch of milk and the measured processing and product information from the second batch of milk.

In one or more of the many possible embodiments of the method, the method further includes controlling a coagulation reaction rate and a duration of a coagulation process for the second batch of milk by adjusting the amount of enzyme added to the second batch of milk.

In one or more of the many possible embodiments of the method, the method further includes monitoring processing conditions of the first batch of milk wherein the processing conditions are selected from a group of processing conditions consisting of mass of milk in the batch, mass of enzyme addition, enzyme type, enzyme activity, milk temperature, calcium addition and combinations thereof.

In one or more of the many possible embodiments of the method, the method further includes monitoring milk composition properties of the first batch of milk and the second batch of milk wherein the milk composition properties are selected from a group of milk properties consisting of protein content, pH, protein to fat ratio, fat and solids content and combinations thereof.

In accordance with yet another aspect, a method of manufacturing cheese on a desired schedule in a cheese production facility having multiple cheese vats comprises the steps of: (a) measuring a coagulation reaction rate of a first batch of milk processed into a first batch of milk coagulum in a first cheese vat and (b) calculating an amount of enzyme to be added to a second batch of milk in a second cheese vat to control a duration of coagulation of said second batch of milk whereby a second batch of milk coagulum is produced having a targeted gel strength at a targeted cutting time.

In one or more of the many possible embodiments of the method, the method further includes measuring coagulation reaction, processing and product information from the first batch of milk.

In one or more of the many possible embodiments of the method, the method further includes measuring processing and product information from the second batch of milk.

In one or more of the many possible embodiments of the method, the method further includes monitoring processing conditions of the first batch of milk wherein the processing conditions are selected from a group consisting of mass of milk, mass of enzyme addition, enzyme type, enzyme activity, milk temperature, calcium addition and combinations thereof.

In one or more of the many possible embodiments of the method, the method further includes monitoring milk composition properties of the first batch of milk and the second batch of milk wherein the milk composition properties are selected from a group of milk properties consisting of protein content, pH, protein to fat ratio, fat and solids content and combinations thereof.

In the following description, there are shown and described several possible embodiments of the method. As it should be realized, the method is capable of other different embodiments and its several details are capable of modification in various, obvious aspects all without departing from the method as set forth and described in the following claims. Accordingly, the drawings and descriptions should be regarded as illustrative in nature and not as restrictive.

DETAILED DESCRIPTION

The milk coagulation process in cheese making can be ideally divided into three time periods based on the predominant chemical reaction taking place. The first is the enzymatic period when the added enzymes attack the milk proteins; the second is the aggregation period when proteins crosslink to form a continuous matrix; and the third is the gel-firming period when the protein matrix collapses to form strands that generate gel strength. Gel strength increases with time during the gel-firming period. Different gel strengths are required for different cheese products to optimize product quality and efficiency of production. Thus, a specific gel strength defines the desired cutting time or endpoint of the coagulation process.

The optical monitoring and control of the milk coagulation process was described in U.S. Pat. No. 5,172,193 in which the infrared light backscatter profile was analyzed to determine infrared time-parameters from maxima and minima of profile derivatives that were correlated to the desired cutting time of the coagulum. The first derivative infrared time-parameter generally occurs in the middle of the aggregation period and was shown to have a strong correlation to the cutting time. A cutting time prediction model containing the first derivative time-parameter and a correction for protein content was developed to predict cutting time.

The fluorescence sensor described in U.S. Pat. No. 9,983,184 provides fluorescent time-parameters that are measured during the gel-firming period. Since fluorescent time-parameters occur during the third period of the milk coagulation process they should improve the precision of a cutting time prediction model because of their closer time proximity to the desired endpoint.

The combination of infrared and fluorescent time-parameters with product and processing parameters results in a precise measure of the desired cutting time or endpoint. This has been shown using data collected from cheese plants to statistically develop cutting time prediction models to correlate time-parameters to the operator-selected cutting times. The resulting precision of the cutting time prediction model opens an opportunity for further automation where multiple vats are used to coagulate milk on a continuous batch basis.

The proposed automation concept or method, Enzyme Assistant, uses the coagulation reaction, processing and product information from one batch and the processing and product information from the next batch and applies chemical reaction principals to estimate the mass of enzyme needed for the next batch to achieve the plant's desired gel strength at the desired cutting time. Enzyme concentration controls the coagulation reaction rate and thus the duration of the coagulation process. With a precise measure of the coagulation reaction rate from the last batch then the amount of enzyme needed for the next batch can be calculated and thus the duration of the milk coagulation process controlled.

For example, if the last batch had a desired coagulation endpoint equal to the plant's desired cutting time but the milk in the next batch has a temperature 1° C. higher than the last batch then the amount of enzyme necessary can be reduced (an increase in milk temperature increases the enzymatic reaction rate) to achieve the plant's desired gel strength at the plant's desired cutting time. The control of enzyme addition requires a precise measurement of the coagulation reactions and a precise measurement of mass of enzyme added.

In one aspect, the method of manufacturing cheese includes the step of monitoring the infrared backscatter response from a first batch of milk undergoing enzymatic coagulation to form a first batch of milk coagulum. The method also includes the step of monitoring the fluorescence backscatter response from the first batch of milk undergoing enzymatic coagulation to form the first batch of milk coagulum. One or more sensors of a type known in the art may be used for these purposes.

The method also includes the step of determining a first batch cutting time for the first batch of milk coagulum using a controller. Such a controller may comprise a computing device, such as a dedicated microprocessor or an electronic control unit (ECU) operating in accordance with instructions from appropriate control software. Such a controller may include one or more processors, one or more memories and one or more network interfaces all in communication with each other over one or more communication buses. The controller has control logic configured to base the first batch cutting time upon time parameters generated from a combination of the infrared backscatter response and the fluorescence backscatter response as well as processing conditions and milk composition properties.

The method also includes the step of determining an amount of enzyme to be added to a second batch of milk to undergo enzymatic coagulation using the controller having said control logic further configured to control a second batch cutting time to a plant cutting time setpoint or target to maximize product quality and processing efficiency.

The method may further include other steps such as determining, by the controller, a consistence of cutting time predictions to alert an operator to non-consistent backscatter that may be detected during the monitoring process.

More specifically, the method may include: (a) monitoring processing conditions of the first batch of milk wherein the processing conditions are selected from a group consisting of mass of milk in the first batch, mass of enzyme addition, enzyme type, enzyme activity, milk temperature, calcium addition and combinations thereof; (b) monitoring milk composition properties of the first batch of milk and the second batch of milk wherein the milk composition properties are selected from a group of milk properties consisting of protein content, pH, protein to fat ratio, fat and solids content and combinations thereof and/or (c) incorporating into the control logic an algorithm that uses infrared and fluorescent time parameters to determine a predicted cutting time of the coagulum and a calibration parameter for adjustment in the plant wherein the predicted cutting time is independent of the enzyme addition time.

In another aspect, the method of manufacturing cheese may be described as including the steps of: (a) measuring coagulation reaction, processing and product information from a first batch of milk undergoing enzymatic coagulation to form a first batch of milk coagulum, (b) measuring processing and product information from a second batch of milk about to undergo enzymatic coagulation and (c) estimating, by controller, a mass of enzyme to be added to the second batch of milk to achieve a desired gel strength at a desired cutting time based upon the measured coagulation reaction, processing and product information from the first batch of milk and the measured processing and product information from the second batch of milk.

Once again, it should be appreciated that the controller may comprise a computing device, such as a dedicated microprocessor or an electronic control unit (ECU) operating in accordance with instructions from appropriate control software as described above.

The method may further include the step of controlling a coagulation reaction rate and a duration of a coagulation process for the second batch of milk by adjusting the amount of enzyme added to the second batch of milk.

Further, the method may include the step of monitoring processing conditions of said first batch of milk wherein said processing conditions are selected from a group of processing conditions consisting of mass of milk in the batch, mass of enzyme addition, enzyme type, enzyme activity, milk temperature, calcium addition and combinations thereof. Still further, the method may include the step of monitoring milk composition properties of the first batch of milk and the second batch of milk wherein said milk composition properties are selected from a group of milk properties consisting of protein content, pH, protein to fat ratio, fat and solids content and combinations thereof.

In yet another aspect, a method of manufacturing cheese on a desired schedule in a cheese production facility having multiple cheese vats includes the steps of: (a) measuring a coagulation reaction rate of a first batch of milk processed into a first batch of milk coagulum in a first cheese vat and (b) calculating an amount of enzyme to be added to a second batch of milk in a second cheese vat to control a duration of coagulation of the second batch of milk whereby a second batch of milk coagulum is produced having a targeted gel strength at a targeted cutting time.

That method may further include the step of measuring coagulation reaction, processing and product information from the first batch of milk. Further, that method may include the step of measuring processing and product information from the second batch of milk.

The method may include the step of monitoring processing conditions of the first batch of milk wherein the processing conditions are selected from a group consisting of mass of milk, mass of enzyme addition, enzyme type, enzyme activity, milk temperature, calcium addition and combinations thereof and/or the step of monitoring milk composition properties of the first batch of milk and the second batch of milk wherein the milk composition properties are selected from a group of milk properties consisting of protein content, pH, protein to fat ratio, fat and solids content and combinations thereof.

Experimental Details

A Regression parameter estimates
$A_E$ Enzymatic Activity of the enzyme, IMCU units.
$\beta$ Calibration parameter used to adjust the cutting time to the plant's preference
CA Calcium addition to a batch of milk, g/kg or kg
E Mass of enzyme added to the batch of milk, kg
fn Abbreviation used to designate a mathematical function
J Indices for identifying the sequential batches of milk processed in a cheese plant
M Mass of milk in a batch, kg
N Exponent used on Factor Effects to adjust for confounding
N1, N2 Exponents on the Enzyme Assistant Model which adjust for the confounding of the factor effects
pH pH of milk
P Protein concentration of milk, %
PF Protein Function—A functional relationship including regression coefficients and milk protein content. A typical Protein Function is (A1+A2*P)
$Q_{10}$ The ratio of chemical reaction rates at a temperature of T+10° C. to that at T
T Temperature of the milk in a batch, F or C
TCUT Cutting time of the coagulum, min
TCUTSP Cutting time set point in a dairy plant, min
PTCUT Predicted cutting time of the coagulum, min
RT2 MAX 1 Second derivative time-parameter from the infrared profile, min
RT1 MAX 1 First derivative time-parameter from the infrared profile, min
RT2 MIN 1 Second derivative time-parameter from the infrared profile, min
FT2 MIN 1 Second derivative time-parameter from the fluorescence profile, min
FT1 MIN 1 First derivative time-parameter from the fluorescence profile, min
FT2 MAX 2 Second derivative time-parameter from the fluorescence profile, min Definitions Cutting Time Prediction Model (or Equation)

A mathematical equation relating the measured time-parameters, processing conditions, and milk properties to the predicted cutting time of the coagulum.

Cutting Time Setpoint

The cutting time setpoint, TCUTSP, is the Desired Cutting Time for a specific product.

Desired Gel-Strength

The desired gel-strength of the coagulum is selected by the cheese plant operator based on the history, experience and art of making their cheese product. Generally speaking, if the coagulum is cut too early there are excessive fines and whey fat losses and if cut too late the cheese moisture increases.

Desired Cutting Time

The desired cutting time is established to regulate a consistent flow of cheese through the downstream processing operations which generally function more uniformly if the batches are produced at a consistent rate.

Empirical Enzymatic Assistant Model

A mathematical model that uses the coagulation reaction, processing and product information from one batch and the processing and product information from the next batch and applies chemical reaction principals to estimate the mass of enzyme needed for the next batch to achieve the plant's desired gel strength at the desired cutting time.

Factor

Physical or chemical properties that influence the coagulation of milk for cheese making including temperature, pH, protein concentration, enzyme addition, enzyme activity, calcium addition and milk mass. The mass of milk was added because in a plant the mass varies, thus affecting the amount of enzyme to be added to the vat. The most common factors include: T, P, E, AE, CA, pH, and M.

Factor Effect

The ratio of a Factor for the next batch of milk to that of the last batch. An example Factor Effect for protein is (P(NEXT)/P(LAST)).

Milk Coagulation Process Control Technology

All or part of the above described technologies is considered the Milk Coagulation Process Control Technology.

Offset

A constant used in developing a mathematical relationship for a factor affecting the coagulation of milk. For example, temperature in ° C. has an offset from absolute zero of 273.15° K.

Process Time

The time after adding enzyme to a batch of milk, min.

Time Reference

A time within a coagulation session identified by a time-parameter.

Novel algorithms have been developed which utilize infrared and fluorescent time-parameters in combination with processing conditions and milk composition properties to yield a precise process control technology for modern dairy plants which need to keep the batch-wise flow of product at a constant rate for efficient downstream processing and packaging. Process control of the milk coagulation process requires the simultaneous integration of the following three algorithms:

A. Cutting Time Prediction Models—developed to predict the cutting time of the coagulum based on optical time-parameters in combination with processing conditions and milk composition properties.

B. Quality Control of Cutting Time Predictions—evaluating multiple cutting time predictions for abnormal predictions.

C. Empirical Enzyme Assistant Model—estimating the amount of enzyme needed in the next batch to deliver the desired gel strength at the desired cutting time.

A. Cutting Time Prediction Models

The following describes the features of a cutting time prediction model that facilitate commercial implementation.

1. Single Plant Calibration Coefficient

One desirable attribute of a cutting time prediction model is the presence of only one calibration parameter for adjustment in the plant. It was previously shown that a Cutting Time Prediction Model having three regression parameter estimates (PTCUT=A0+A1*RT1 MAX 1+A2*PROTEIN) could predict the cutting time over a broad range of processing variables (three levels each of Fat, pH, P, CA, E and T). Unfortunately, this model has three regression parameter estimates A0, A1, and A2 and is not easily calibrated in plants. Payne (1995) simplified the Cutting Time Prediction Model for a plant installation to:

$$PTCUT=\beta*RT1 \text{ MAX } 1 \quad \text{Equation 1}$$

This model has only one regression parameter estimate, β, and is easily calibrated by the dairy plant cheesemaker. Should additional regression parameter estimates be needed, for example to adjust for the effect of protein, then the regression parameters must be selected such that they remain constant in the prediction equation and are not changed at the plant.

2. Independence of Enzyme Addition Time

A second desirable attribute of a cutting time prediction model is that it is independent of the enzyme addition time in a cheese plant. This has a practical benefit because in some dairy plants enzyme addition time is not exact and may take from 10 seconds to two minutes and, in highly automated plants, the piping distance from the enzyme mixture source to the cheese vat may differ for each vat. The mixing of the enzyme into the cheese vat may also affect the time-parameters. These processing variables contribute to the uncertainty of a specific enzyme addition time. The first derivative infrared time-parameter RT1 MAX 1 in the above equation is measured from the enzyme addition time. An alternative such as Equation 2 in U.S. Pat. No. 9,983,184 where (PTCUT=A1*(F2 MAX 1−F2 MIN 1)+A2*P+A3) is to relate the cutting time to a difference between time-parameters such as (F2 MAX 1−F2 MIN 1). However, that equation is not totally independent of the enzyme addition time because PTCUT is referenced to the enzyme addition time. Using a time-parameter as a time reference will facilitate making the cutting time prediction model independent of the enzyme addition time.

3. Reference Time-Parameter

The use of a time reference or time-anchor provides a method for eliminating the differences in enzyme addition time. Any one of the time-parameters can be used as a time reference. The reference time-parameter divides the coagulation process into two distinct periods. The first time period is from the enzyme addition time to the reference time-parameter and the second time period is from the reference time-parameter to the cutting time. Thus, by using the reference time-parameter the predictive task is reduced to estimating the processing time of the second time period. The use of a reference time-parameter or time-anchor to divide the coagulation period into two periods is a unique addition that eliminates the effect of variable enzyme addition times.

4. Mathematical Terms

Mathematical terms can be generated that are also independent of the enzyme addition time. Time-parameter differences (FT1 MIN 1−RT1 MAX 1); the ratio of time-parameter differences; the square of time-parameter differences; the reciprocal of time-parameter differences; the multiplication of time-parameter differences are just examples of mathematical terms that can be used to develop a cutting time prediction model. The use of a time-anchor, time-parameter differences and a calibration constant, β, are exemplified in the following Cutting Time Prediction Model:

$$PTCUT=FT1 \text{ MIN } 1+\beta*(FT1 \text{ MIN } 1-RT1 \text{ MAX } 1) \quad \text{Equation 2}$$

where (FT1 MIN 1−RT1 MAX 1) is the difference between an infrared and fluorescent time-parameter and FT1 MIN 1 is the reference time-parameter or time-anchor. Equation 2 is ideally independent of the enzymatic addition time as shown by rearranging to (PTCUT−FT1 MIN 1)=β*(FT1 MIN 1−RT1 MAX 1) whereas Equation 2 in U.S. Pat. No. 9,983,184 is not ideally independent of the enzyme addition time. The independence of the new Equation 2 from the variable enzyme addition time in plants is an important and practical solution which improves the precision of prediction in plants where there are differences in the enzyme addition time.

5. Protein Correction

The ideal cutting time prediction model will not include protein because the plants normally do not check every batch of milk coagulated for protein. In some plants they do check silos for different protein contents. However, the inclusion of a Protein Function improves the cutting time prediction as previously shown. This result is because gel-firming phase tends to decrease with protein content. A Protein Function was described in both U.S. Pat. Nos. 5,172,193 and 9,983,184. The precision of the cutting time prediction equations is improved with the inclusion of a Protein Function as described as follows:

$$PF = (A3 + A4 * PROTEIN) \quad \text{Equation 3}$$

where A3 and A4 are regression parameter estimates determined from a statistical evaluation of data.

6. Multiple Mathematical Terms

The use of multiple terms may improve the precision of the cutting time prediction equation. Equation 4 is a cutting time prediction equation that includes a reference time-parameter or time-anchor, protein function (PF), a calibrating constant (3, and multiple time-parameter differences:

$$PTCUT = FT1 \text{ MIN } 1 + \beta *((FT1 \text{ MIN } 1 - RT1 \text{ MAX } 1) + A1*(FT1 \text{ MIN } 1 - FT2 \text{ MIN } 1))*(PF) \quad \text{Equation 4}$$

The combination of mathematical terms that can be generated from the time parameters, protein content, and other factors are many. It is the statistical significance of their addition to a model that determines their usefulness.

B. Quality Control of Cutting Time Predictions

In a cheese plant there is an occasional distortion of the optical profiles that yield erroneous data from the first and second derivatives that are considered "Outliers". A novel method that uses three cutting time prediction equations was developed to automatically identify these outliers. An example of three cutting time prediction equations is as follows:

$$PTCUTA = FT1 \text{ MIN } 1 + \beta A*((FT1 \text{ MIN } 1 - RT1 \text{ MAX } 1))*(PF) \quad \text{Equation 5}$$

$$PTCUTB = FT1 \text{ MIN } 1 + \beta B*((FT1 \text{ MIN } 1 - FT2 \text{ MIN } 1) + (FT1 \text{ MIN } 1 - RT1 \text{ MAX } 1))*(PF) \quad \text{Equation 6}$$

$$PTCUTC = FT2 \text{ MAX } 1 + \beta C*(PF) \quad \text{Equation 7}$$

The absolute (ABS) differences between these cutting time predictions is calculated as:

DIFF1=ABS(PTCUTA−PTCUTB)

DIFF2=ABS(PTCUTB−PTCUTC)

DIFF3=ABS(PTCUTC−PTCUTA)

If the differences exceed a plant specified limit, typically 1.5 minutes, then the cheese plant operator is alerted to manually make the cutting time selection. This is a novel method for integrating an internal quality control method into the Milk Coagulation Process Control Technology.

C. Empirical Enzyme Assistant Model

A Theoretical Enzyme Assistant Model (U.S. Provisional Patent Application Ser. No. 61/725,606 which was withdrawn because of poor performance and financial reasons) was developed and very briefly hand tested in 2013 at a Wisconsin dairy plant with poor results. The theoretical model was developed with many assumptions and resulted in a linear product of Factor Effects for predicting the enzyme concentration adjustments. Factor Effects are ratios of factors that affect the rate of enzyme coagulation. When there is no change in a factor between batches then the Factor Effect will be 1. The model predictions were also found not precise when tested using the laboratory collected data used for U.S. Pat. No. 5,172,193 in which cutting times were collected in a six-factor statistical test to determine the effect of fat, P, T, E, pH, and CA.

A. Theoretical Model

A Theoretical Enzyme Assistant Model was previously developed (U.S. Provisional Patent Application Ser. No. 61/725,606) around the infrared light backscatter sensor measurement of RT1 MAX 1 and the resulting predicted cutting time PTCUT. The following model was developed to calculate the needed adjustment of the enzyme addition, E, in the next vat for the following factors: predicted cutting time, cutting time set point, protein, enzyme added to the last batch, activity of the enzyme, mass of milk, temperature, pH, and calcium addition:

$$\frac{E(J)}{E(J-1)} = \frac{PTCUT(J-1)}{PTCUTSP} * \frac{P(J-1)}{P(J)} * \frac{A_E(J-1)}{A_E(J)} * \frac{M(J)}{M(J-1)} * \P Q_{10}^{\frac{T(J-1)-T(J)}{10}} * \left(fn\left(\frac{pH(J-1)}{pH(J)}\right)\right) * \left(fn\left(\frac{CA(J-1)}{CA(J)}\right)\right). \quad \text{Equation 8}\P$$

Where the indices (J) is for the next batch and (J−1) for the last batch.

Equation (8) is a product of linear ratios. It incorrectly assumes the enzyme concentration adjustments E(J)/E(J−1) is linearly related to all factors. This is an incorrect assumption because the Factor Effects are confounded and thus the linear model is imprecise. For example, for a 10% change in either PTCUT, P, AE, M, T, pH or CA then Equation 8 predicts a 10% effect on the mass of enzyme required, E(J). Confounding means that, for example, part of a temperature effect is described by the cutting time ratio, PTCUT(J−1)/PTCUTSP. Likewise, part of a pH effect is described by the cutting time ratio. Linearity with E, however, is only valid for the mass of milk (M) and most likely Enzyme Activity, AE. The effect of P, T, pH, and CA are confounded with the cutting time ratio. The addition of exponents to the Factors Effects can adjust for confounding as shown in the next section.

B. Empirical Enzyme Assistant Model

An Empirical Enzyme Assistant Model is now developed that uses exponents on the Factor Effects along with a new technology (U.S. Pat. No. 9,983,184) for predicting the cutting time, PTCUT. The Factor Effects were generally modeled as follows:

$$\text{Factor Effect} = (((FactorNext - Offset))/((FactorLast - Offset)))^N \quad \text{Equation 9}$$

where N=exponent or power on the Factor Effect.

The power, N, adjusts the Factor Effect for its actual influence on the cutting time. If N is greater than 1.0 then the Factor Effect is greater than linear, if N is near 1.0 the effect is linear, and if N is less than 1.0 the effect is less than linear. The closer N is to zero then the less effect the Factor Effect has on cutting time. If N is negative the numerator and denominator may be arbitrarily switched to yield a positive exponent. This is a novel method for adjusting the rate at which the Enzyme Assistant corrects for a processing change. Additionally, in a plant setting N can be adjusted to slow the rate at which an adjustment is made to not overshoot the desired response.

The Factor Effect model in Equation 9 allows the factor to be tested with and without an offset. Sometimes there is an offset that will assist a functional description. Temperature in ° F. or ° C. has an offset (from absolute zero). There is calcium in the milk so when calcium is added there may need to be an offset to account for the calcium naturally present in the milk.

An absolute requirement for the empirical model is that the Factor Effect must have a value of 1 if there is no change in the factor between batches.

Empirical Enzyme Assistant Model

A general Empirical Enzyme Assistant Model that includes the Factor Effects being considered is as follows:

$$(E\text{ Effect}) = (\text{pH Effect})^N (M\text{ Effect})^N (\text{TCUT Effect})^N (\text{CA Effect})^N (P\text{ Effect})^N (\text{AE Effect})^N \quad \text{Equation 10}$$

where N for each Factor Effect is different, and each Factor Effect is modeled as in Equation 9.

The Empirical Enzyme Assistant Model is most useful for typical milk coagulation processes that include the following Factor Effects: PTCUT, T, M, P. Other Factor Effects may be needed under different processing conditions. The Protein Effect may be included in the cutting time prediction models and it is expected that the effect of protein is included in predicted cutting time, PTCUT, and inclusion in the Empirical Enzyme Assistant Model would be redundant. The following Empirical Enzyme Assistant Model was developed for implementation in a typical cheese plant:

$$E(\text{NEXT}) = E(\text{LAST}) \left( \left( \frac{TCUT(\text{LAST})}{TCUTSP} \right)^{N1} * \left( \frac{(T(\text{LAST}) - 77)}{(T(\text{NEXT}) - 77)} \right)^{N2} * \left( \frac{M(\text{NEXT})}{M(\text{LAST})} \right) \right) \quad \text{Equation 11}$$

Equation 11 was statistically tested using the data collected for the publication by Payne et al. (1993). Six Factors were tested at three levels each: pH, E, T, Ca, P and Fat. A statistical procedure which took the results of a test (LAST) to predict the results of another test (NEXT) was used to determine the coefficients N1 and N2. This procedure allows the determination of the Factor Effects using data where there is confounding. The resulting novel Empirical Enzyme Assistant Model (Equation 11) should have broad applicability over a range of processing variables normally encountered in cheese processing.

Reducing the exponent N reduces the rate at which an enzyme change is implemented to meet a measured processing factor change in T, M, or TCUT. With additional data the exponents may be changed to better match the actual processing requirements. Thus, the adjustment of the exponents in Equation 11 provides a novel method of controlling the rate at which the Enzyme Assistant attempts to correct for a processing difference.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A method of manufacturing cheese, comprising:
   measuring coagulation reaction, processing and product information from a first batch of milk undergoing enzymatic coagulation to form a first batch of milk coagulum;
   monitoring and measuring processing and product information from a second batch of milk about to undergo enzymatic coagulation;
   estimating, by controller, a mass of enzyme to be added to said second batch of milk to achieve a desired gel strength at a desired cutting time based upon the measured coagulation reaction, processing and product information from the first batch of milk and the measured processing and product information from the second batch of milk; and
   controlling a coagulation reaction rate and a duration of a coagulation process for the second batch of milk by adjusting an amount of enzyme added to the second batch of milk wherein the processing and product information is selected from a group of processing and product information including mass of milk in the batch, mass of enzyme addition, enzyme type, enzyme activity, milk temperature, calcium addition and combinations thereof.

2. The method of claim 1, wherein the processing and product information further includes protein content, pH, protein to fat ratio, fat and solids content and combinations thereof.

3. A method of manufacturing cheese on a desired schedule in a cheese production facility having multiple cheese vats, comprising:
   measuring a coagulation reaction rate of a first batch of milk processed into a first batch of milk coagulum in a first cheese vat; and
   monitoring and measuring processing and product information from the first batch of milk wherein the processing and product information is selected from a group of processing and product information including mass of milk, mass of enzyme addition, enzyme concentration, milk temperature, calcium addition and combinations thereof; and
   calculating an amount of enzyme to be added to a second batch of milk in a second cheese vat to control a duration of coagulation of said second batch of milk whereby a second batch of milk coagulum is produced having a targeted gel strength at a targeted cutting time.

4. The method of claim 3, including measuring processing and product information from the second batch of milk.

5. The method of claim 4, wherein the processing and product information further includes protein content, pH, protein to fat ratio, fat and solids content and combinations thereof.

6. A method of manufacturing cheese on a desired schedule in a cheese production facility having multiple cheese vats, comprising:
   measuring a coagulation reaction rate of a first batch of milk processed into a first batch of milk coagulum in a first cheese vat;
   monitoring and measuring processing and product information from the first batch of milk wherein the processing and product information is selected from a group of processing and product information consisting of protein content, pH, protein to fat ratio, fat and solids content and combinations thereof; and
   calculating an amount of enzyme to be added to a second batch of milk in a second cheese vat to control a duration of coagulation of said second batch of milk whereby a second batch of milk coagulum is produced having a targeted gel strength at a targeted cutting time.

7. A method of manufacturing cheese, comprising:

measuring coagulation reaction, processing and product information from a first batch of milk undergoing enzymatic coagulation to form a first batch of milk coagulum;

monitoring and measuring processing and product information from a second batch of milk about to undergo enzymatic coagulation;

estimating, by controller, a mass of enzyme to be added to said second batch of milk to achieve a desired gel strength at a desired cutting time based upon the measured coagulation reaction, processing and product information from the first batch of milk and the measured processing and product information from the second batch of milk; and controlling a coagulation reaction rate and a duration of a coagulation process for the second batch of milk by adjusting an amount of enzyme added to the second batch of milk wherein the processing and product information is selected from a group of processing and product information consisting of protein content, pH, protein to fat ratio, fat and solids content and combinations thereof.

* * * * *